US012810541B2

(12) United States Patent
Doyon et al.

(10) Patent No.: US 12,810,541 B2
(45) Date of Patent: Nov. 24, 2026

(54) LASER SCANNER WITH HIGH DYNAMIC RANGE

(71) Applicant: ZEBRA TECHNOLOGIES CORPORATION, Lincolnshire, IL (US)

(72) Inventors: Michel Doyon, Lachine (CA); Arnaud Lina, Montreal (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 360 days.

(21) Appl. No.: 18/204,182

(22) Filed: May 31, 2023

(65) Prior Publication Data

US 2024/0404190 A1 Dec. 5, 2024

(51) Int. Cl.

| | |
|---|---|
| ***G06T 17/00*** | (2006.01) |
| ***G06T 7/73*** | (2017.01) |
| ***H04N 13/243*** | (2018.01) |
| ***H04N 13/25*** | (2018.01) |
| ***H04N 23/71*** | (2023.01) |
| ***H04N 23/73*** | (2023.01) |

(52) U.S. Cl.

CPC ................ *G06T 17/00* (2013.01); *G06T 7/73* (2017.01); *H04N 13/243* (2018.05); *H04N 13/25* (2018.05); *H04N 23/71* (2023.01); *H04N 23/73* (2023.01); *G06T 2200/08* (2013.01); *G06T 2207/10012* (2013.01); *G06T 2207/10028* (2013.01); *G06T 2207/10144* (2013.01)

(58) Field of Classification Search

CPC ............ G01B 11/2518; G01B 11/2545; H04N 13/239; H04N 13/243; H04N 13/25; H04N 13/254; H04N 23/71; H04N 23/73; G06T 17/00; G06T 2200/08; G06T 2207/10012; G06T 2207/10028; G06T 2207/10144; G06T 7/521; G06T 7/593; G06T 7/73

See application file for complete search history.

(56) References Cited

U.S. PATENT DOCUMENTS 10,536,666 B1 * 1/2020 Robertson ............ G11B 27/036
11,561,102 B1 * 1/2023 Ebrahimi Afrouzi ........................ A47L 11/4011
2004/0240754 A1 * 12/2004 Smith .................. G01B 11/024 382/154
2005/0111009 A1 5/2005 Keightley et al.
2008/0273211 A1 11/2008 Schmitt et al.
2015/0222820 A1 * 8/2015 Costigan ............. G01M 17/027 348/142
2017/0046845 A1 2/2017 Boyle et al.
2017/0067734 A1 3/2017 Heidemann et al.

(Continued)

OTHER PUBLICATIONS

Calibration Procedure for 3D Measurement Systems Using Two Cameras and a Laser Line, J. L. Vilaca et al., Jun. 24, 2008.

(Continued)

*Primary Examiner* — Ming Wu

(57) ABSTRACT

Laser scanners with high dynamic range are disclosed herein. An example scanner includes a laser line projector configured to project a laser line, a first camera, and a second camera, wherein the first camera and the second camera are configured to simultaneously image a target object while the laser line is projected onto the target object and wherein the first camera has a different light acquisition configuration from the second camera.

20 Claims, 6 Drawing Sheets

(56) References Cited

U.S. PATENT DOCUMENTS

| | | | |
|---|---|---|---|
| 2017/0365065 | A1 | 12/2017 | Stigwall et al. |
| 2019/0331474 | A1 | 10/2019 | Clayton et al. |

OTHER PUBLICATIONS

PCT/US24/26522—International Search Report, USPTO ISA/US, Aug. 22, 2024.
PCT/US24/26522—Written Opinion of the International Searching Authority (ISA), USPTO ISA/US, Aug. 22, 2024.

* cited by examiner

LASER SCANNER WITH HIGH DYNAMIC RANGE

BACKGROUND

Three-dimensional digital imaging is a field of endeavor with diverse and wide-ranging applications and use cases. One popular solution for producing a three-dimensional model of an item is a laser scanner. A three-dimensional digital laser scanner may be expected to accurately produce digital models of items that possess a plethora of disparate characteristics. For example, a single laser scanner may encounter highly specular items, items that absorb light, and items that reflect light at angles that are problematic for imaging.

SUMMARY

The present disclosure provides new and innovative devices, methods, and systems for performing three-dimensional imaging on objects that possess a wide range of difficult-to-image characteristics. In an example embodiment, the present invention is a scanner, comprising a laser line projector configured to project a laser line, a first camera, and a second camera, wherein the first camera and the second camera are configured to simultaneously image a target object while the laser line is projected onto the target object and wherein the first camera has a different light acquisition configuration from the second camera.

In a variation of this example embodiment, a light acquisition configuration comprises an exposure time, and the first camera is configured to begin a first exposure at a first time before the second camera is configured to begin a second exposure at a second time and the first exposure is configured to end at a fourth time after the second exposure is configured to end at a third time.

In another variation of this example embodiment, the scanner further comprises at least one additional camera configured with a light acquisition configuration that differs from a light acquisition configuration of the first camera and a light acquisition configuration of the second camera.

In another variation of this example embodiment, the scanner calculates a location of a point on a surface of the target object based upon data from a selected camera of one of the first camera or the second camera.

In another variation of this example embodiment, the scanner chooses the selected camera responsive to at least one of a determination that an image from an unselected camera contains a too large apparent laser line or a determination that an image from the selected camera contains a thinnest apparent laser line.

In another variation of this example embodiment, the selected camera is chosen for all points visible in an image based upon a single determination.

In another variation of this example embodiment, the scanner generates fused data with data from the first camera and data from the second camera and calculates a location of a point on a surface of the object based upon the fused data.

In another variation of this example embodiment, the laser line projector is configured to project a laser line as a pulse when at least one of the first camera and the second camera are capturing an image.

In another example embodiment, the present invention is a method for generating digital 3D point clouds of physical objects comprising projecting a laser line onto a target object, capturing a first image with a first camera that has a first light acquisition configuration, simultaneously capturing a second image with a second camera that has a second light acquisition configuration, analyzing the first image and the second image to determine how to most accurately calculate a location of a point on a surface of the target object based on the first image and the second image, and calculating the location of the point based on the analysis of the first image and the second image to add the point to a 3D point cloud.

In a variation of this example embodiment, the method further comprises adding the point to the 3D point cloud and storing the 3D point cloud in a memory.

In another variation of this example embodiment, the analyzing comprises determining that an image contains at least one of a thinnest apparent laser line or a largest apparent laser line.

In another variation of this example embodiment, the method further comprises either generating fused data with the first image and the second image or selecting a camera responsive to the determination that an image contains at least one of a thinnest apparent laser line or a largest apparent laser line, and calculating a location of the point based upon the fused data or data from the selected camera.

In another variation of this example embodiment, the method further comprises capturing and analyzing additional images with additional cameras that have light acquisition configurations that differ from each other and those of the first camera and the second camera.

In another variation of this embodiment, the method further comprises projecting at least one additional laser line onto the target object.

In another variation of this example embodiment, the capturing the first image is partially simultaneous with the capturing the second image.

In yet another example embodiment, the present invention is a system, comprising a memory and a processing device, operatively coupled to the memory, to project a laser line onto a target object, capture a first image with a first camera that has a first light acquisition configuration, simultaneously capture a second image with a second camera that has a second light acquisition configuration, analyze the first image and the second image to determine how to most accurately calculate a location of a point on a surface of the target object based on the first image and the second image, and calculate the location of the point based on the analysis of the first image and the second image to add the point to a 3D point cloud.

In a variation of this example embodiment, the system is configured to add the point to the 3D point cloud and store the 3D point cloud in a memory.

In another variation of this example embodiment, the analysis comprises a determination that an image contains at least one of a thinnest apparent laser line or a largest apparent laser line.

In another variation of this example embodiment, the processing device either generates fused data with the first image and the second image or selects a camera responsive to the determination that an image contains at least one of a thinnest apparent laser line or a largest apparent laser line, and calculates a location of the point based upon the fused data or data from the selected camera.

In another variation of this example embodiment, the system is configured to capture and analyze additional images with additional cameras that have light acquisition configurations that differ from each other and those of the first camera and the second camera.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
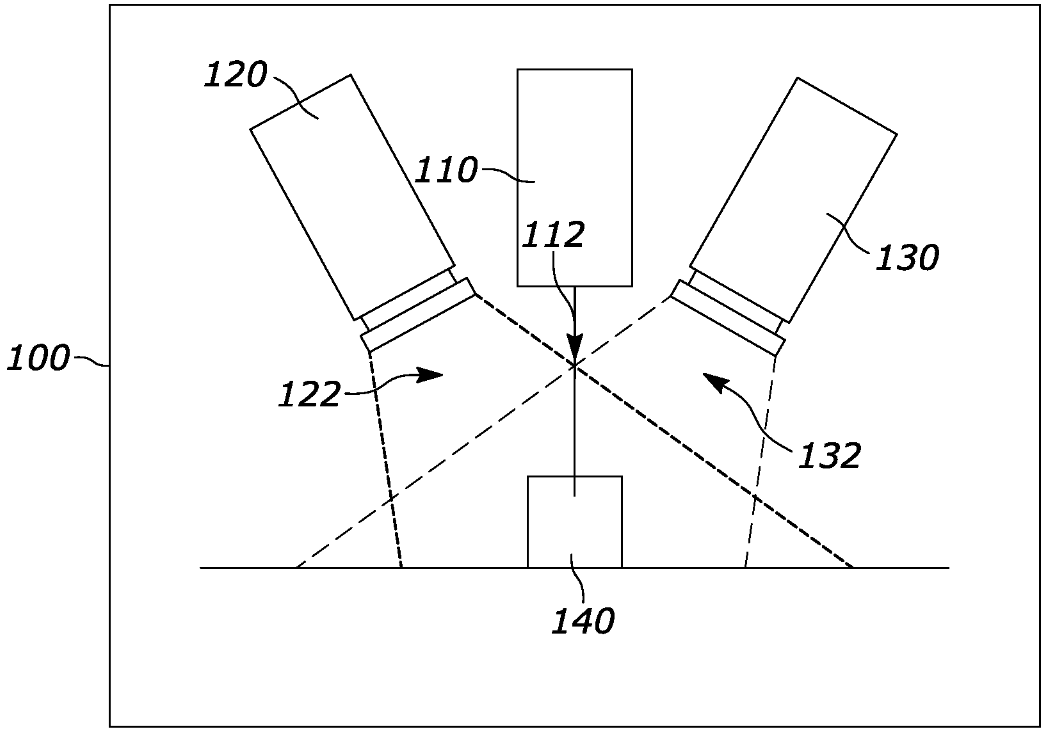
FIG. 1 illustrates an example scanner, according to embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Devices and techniques are disclosed herein for generating digital 3D point clouds of physical objects. When scanning an object using a 3D laser triangulation scanner, depending on a relative orientation of a scanned surface, a laser line may either be insufficiently saturated or oversaturated. For example, on one portion of the object's surface the laser line may be reflected away from a camera while another portion of the object's surface may reflect the laser line directly towards the camera, leading to exposure saturation. In such a scenario, finding a single light acquisition configuration that allows reconstruction of the entire object may be impossible.

High Dynamic Range (HDR) imaging may thus be used to image the object with multiple light acquisition configurations, allowing data from the images to be combined for full object reconstruction. HDR imaging comes with tradeoffs, however, since the scanner must either significantly slow a scanning process in order to capture multiple images of each laser line location or sacrifice quality for the sake of speed. It is therefore desirable to implement a system which can rapidly perform HDR imaging without sacrificing quality. This can be achieved by creating a scanner with multiple cameras which can simultaneously capture images of an object with varying light acquisition configurations. Employing multiple cameras presents some new technical challenges, solutions to which are discussed herein.

FIG. 1 illustrates an example scanner 100, according to embodiments of the present disclosure. The example scanner 100 includes a laser line projector 110 configured to project a laser line 112 onto a target object 140 which is in a first field of view 122 (first FOV 122) of a first camera 120 with a first light acquisition configuration and a second field of view 132 (second FOV 132) of a second camera 130 with a second light acquisition configuration.

When the target object 140 moves into a position below the laser line projector 110 and within the first FOV 122 and the second FOV 132, the laser line projector 110 may be configured to begin projecting the laser line 112 onto the target object 140. The target object 140 may move along a horizontal axis that is perpendicular to a plane formed by the laser line 112.

Once the laser line 112 is projected onto the target object 140, the first camera 120 and the second camera 130 may begin simultaneously capturing images of the target object 140. A processing device (see FIG. 9) may employ a known first distance between the first camera 120 and the laser line projector 110, a known second distance between the first camera 120 and a surface on which the target object 140 sits, and data from the first camera 120 to triangulate a location of a point where the laser line 112 intersects a surface of the target object 140. The processing device may also employ other mapping methods to calculate a location. For example, more complex mapping processes may be required to compensate for lens distortion, laser distortion, and other issues not discussed herein. A similar process may be employed to process data from the second camera 130. Captured images may be combined into a fused set of data or individual images may be selected for further processing (see FIG. 7 and FIG. 8).

The first light acquisition configuration and the second light acquisition configuration (light acquisition configurations, collectively) may be a first exposure time and a second exposure time of the first camera 120 and the second camera 130, respectively. The light acquisition configurations may be achieved by tinting a first input light and a second input light (input lights, collectively) of the first camera 120 and the second camera 130, respectively. The tinting may be achieved with permanently tinted materials, with variable-tint materials, or combinations thereof. The light acquisition configurations may be achieved by manipulating aperture sizes within the first camera 120 and the second camera 130, respectively. The light acquisition configurations may be achieved by manipulating a sensitivity of light sensors within the first camera 120 and the second camera 130, respectively. The light acquisition configurations may be analog gain values. The light acquisition configurations may be achieved by implementing any combination of the aforementioned techniques, and may include additional techniques not described herein. When the light acquisition configurations are achieved at least partially by manipulating exposure times of the first camera 120 and the second camera 130, respectively, timing offsets may be required to ensure that each camera captures an image that contains the laser line 112 projected onto a same location relative to the target object 140 (see FIG. 6).

The first camera 120 and the second camera 130 may be mounted in any location and orientation in which the laser line 112 can be viewed then projected onto the target object 140. For example, the first camera 120 and the second camera 130 may both be mounted on a same side of the laser line projector 110, rather than on opposite sides as illustrated. It should also be appreciated that relative sizes of the various elements of the example scanner 100 and the target object 140 are for illustrative purposes, and that real-world embodiments are likely to possess differing proportions to those depicted herein.

Figure 2:
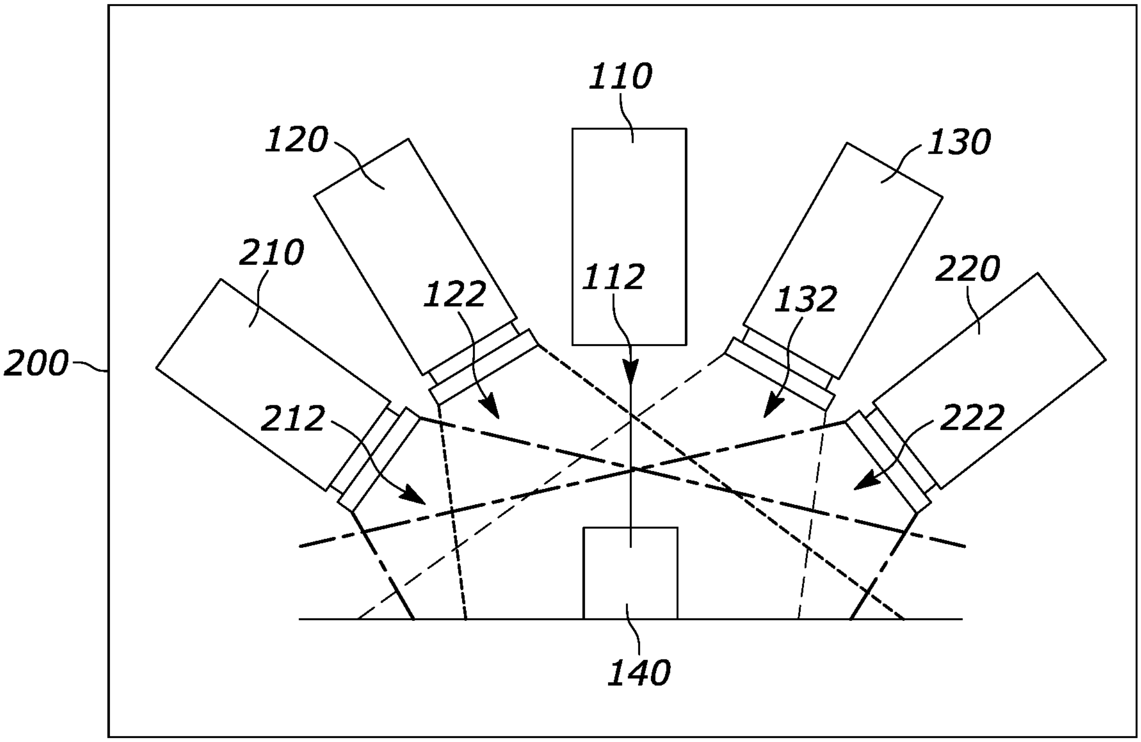
FIG. 2 illustrates an example scanner with additional cameras, according to embodiments of the present disclosure.

FIG. 2 illustrates an example scanner 200 with additional cameras, according to embodiments of the present disclosure. The example scanner 200 includes a laser line projector 110 configured to project a laser line 112 onto a target object 140 which is in a first field of view 122 (first FOV 122) of a first camera 120 with a first light acquisition configuration, a second field of view 132 (second FOV 132) of a second camera 130 with a second light acquisition configuration, a third field of view 212 (third FOV 212) of a third camera 210 with a third light acquisition configuration, and a fourth field of view 222 (fourth FOV 222) of a fourth camera 220 with a fourth light acquisition configuration.

When the target object 140 moves into a position below the laser line projector 110 and within the first FOV 122, the second FOV 132, the third FOV 212, and the fourth FOV 222, the laser line projector 110 may be configured to begin projecting the laser line 112 onto the target object 140. The target object 140 may move along a horizontal axis that is perpendicular to a plane formed by the laser line 112.

Once the laser line 112 is projected onto the target object 140, the first camera 120, the second camera 130, the third camera 210, and the fourth camera 220 may begin simultaneously capturing images of the target object 140. A processing device (see FIG. 9) may employ a known first distance between the first camera 120 and the laser line projector 110, a known second distance between the first camera 120 and a surface on which the target object 140 sits, and data from the first camera 120 to triangulate a location of a point where the laser line 112 intersects a surface of the target object 140. A similar process may be employed to process data from the second camera 130, the third camera 210, and the fourth camera 220. Captured images may be combined into a fused set of data or individual images may be selected for further processing (see FIG. 7 and FIG. 8).

Inclusion of the third camera 210 and the fourth camera 220 allows the example scanner 200 to capture additional images with additional light acquisition configurations without sacrificing speed or quality. Though the example scanner 200 is illustrated with four cameras, any quantity of cameras greater than or equal to two may be included in the example scanner 200. The cameras may be mounted as illustrated or in any other configuration, so long as each camera is able to view the laser line 112 projected onto the target object 140.

Figure 3:
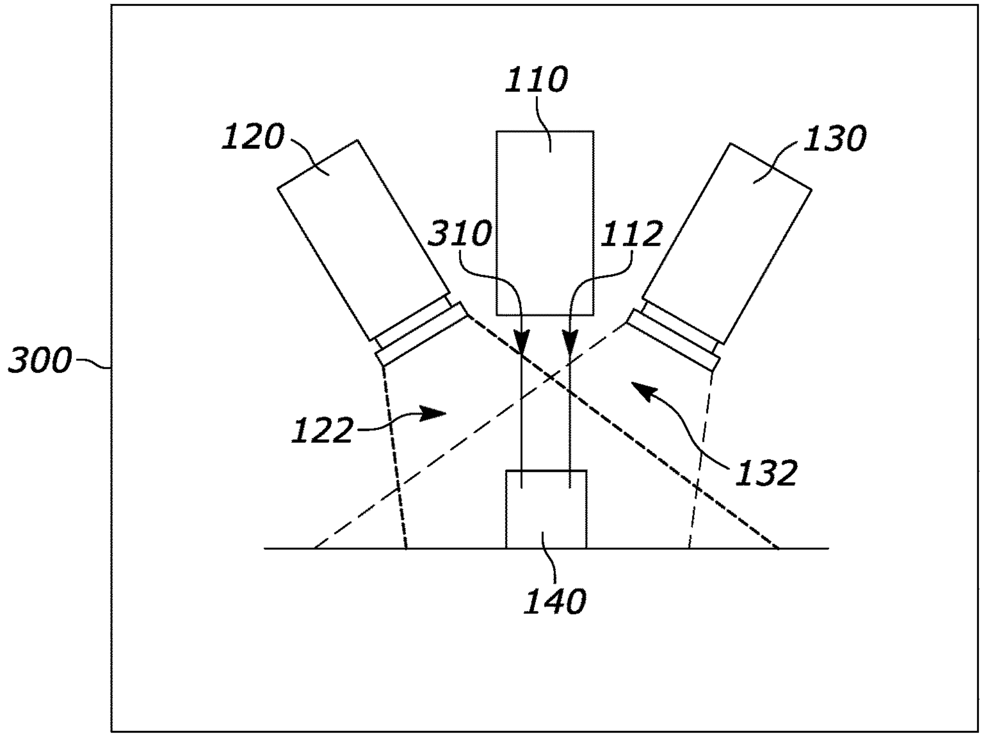
FIG. 3 illustrates an example scanner that is configured to project an additional laser line onto a target object, according to embodiments of the present disclosure.

FIG. 3 illustrates an example scanner 300 that is configured to project an additional laser line 310 onto a target object 140, according to embodiments of the present disclosure. The example scanner 300 includes a laser line projector 110 configured to project a laser line 112 and an additional laser line 310 onto a target object 140 which is in a first field of view 122 (first FOV 122) of a first camera 120 with a first light acquisition configuration and a second field of view 132 (second FOV 132) of a second camera 130 with a second light acquisition configuration.

When the target object 140 moves into a position below the laser line projector 110 and within the first FOV 122 and the second FOV 132, the laser line projector 110 may be configured to begin projecting the laser line 112 onto the target object 140. The target object 140 may move along a horizontal axis that is perpendicular to a plane formed by either the laser line 112 or the additional laser line 310.

Once the laser line 112 and the additional laser line 310 are projected onto the target object 140, the first camera 120 and the second camera 130 may begin simultaneously capturing images of the target object 140. A processing device (see FIG. 9) may employ a known first distance between the first camera 120 and the laser line projector 110, a known second distance between the first camera 120 and a surface on which the target object 140 sits, and data from the first camera 120 to triangulate a location of a point where the laser line 112 or the additional laser line 310 intersects a surface of the target object 140. A similar process may be employed to process data from the second camera 130. Captured images may be combined into a fused set of data or individual images may be selected for further processing (see FIG. 7 and FIG. 8).

The potential advantages of projecting the additional laser line 310 include, but are not limited to, measuring points along the laser line 112 and the additional laser line 310 simultaneously, acquiring multiple 3D profiles simultaneously without moving the target object 140, or reducing a need to move the object 140. The additional laser line 310 may be a wavelength of light that is different from a wavelength of light of the laser line 112. Different wavelengths of light may help a processing device differentiate between the laser line 112 and the additional laser line 310.

The laser line 112 and the additional laser line 310 may each be assigned to one of the first camera 120 or the second camera 130, where one of the first camera 120 or the second camera 130 may be configured to capture images for measuring locations of points along the laser line 112, and the other of the first camera 120 or the second camera 130 may be configured to capture images for measuring points along the additional laser line 310. In such an arrangement, the light acquisition configurations may include a visual intensity of the laser line 112 that may be different from a visual intensity of the additional laser line 310. Varying visual intensities of the laser line 112 and the additional laser line 310 instead of or in addition to modifying the first camera 120 and the second camera 130 directly to achieve differing light acquisition configurations may reduce complexity and therefore cost of embodiment systems.

Figure 4:
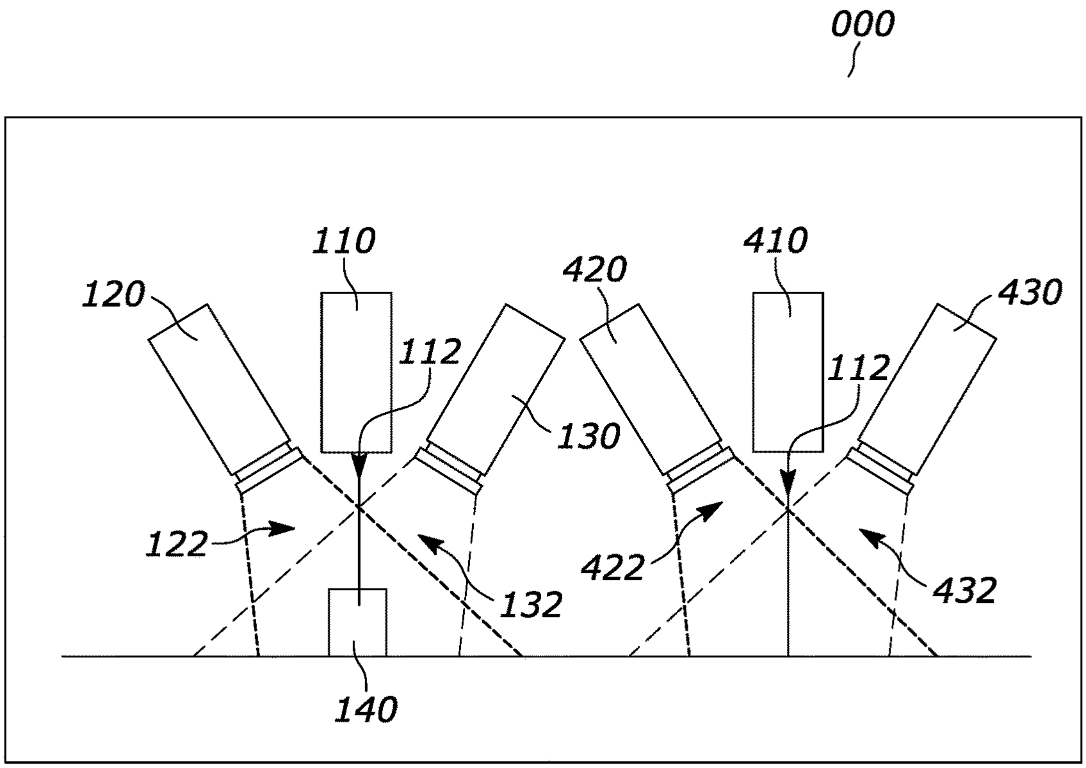
FIG. 4 illustrates an example scanner that has additional cameras and is configured to project an additional laser line onto a target object, according to embodiments of the present disclosure.

FIG. 4 illustrates an example scanner 400 that has additional cameras and is configured to project an additional laser line 412 onto a target object 140, according to embodiments of the present disclosure. The example scanner 400 includes a laser line projector 110 configured to project a laser line 112 onto a target object 140 when the target object 140 is in a first field of view 122 (first FOV 122) of a first camera 120 with a first light acquisition configuration and a second field of view 132 (second FOV 132) of a second camera 130 with a second light acquisition configuration. The example scanner 400 also includes an additional laser line projector 410 configured to project an additional laser line 412 onto the target object 140 when the target object 140 is in a third field of view 422 (third FOV 422) of a third camera 420 with a third light acquisition configuration and a fourth field of view 432 (fourth FOV 432) of a fourth camera 430 with a fourth light acquisition configuration.

When the target object 140 moves into a position below the laser line projector 110 and within the first FOV 122 and the second FOV 132 the laser line projector 110 may be configured to begin projecting the laser line 112 onto the target object 140. The first camera 120 and the second camera 130 may proceed to capture images of the target object 140 as the target object 140 passes under the laser line projector 110. The target object 140 may then move along a horizontal axis that is perpendicular to a plane formed by the laser line 112 into a position below the additional laser line projector 410.

When the target object 140 moves into a position below the additional laser line projector 410 and within the third FOV 422 and the fourth FOV 432 the additional laser line projector 410 may be configured to begin projecting the additional laser line 412 onto the target object 140. The third camera 420 and the fourth camera 430 may proceed to capture images of the target object 140 as the target object 140 passes under the additional laser line projector 410. Captured images may be combined into a fused set of data or individual images may be selected for further processing (see FIG. 7 and FIG. 8).

The inclusion of multiple clusters of cameras centered around multiple laser line projectors allows for the inclusion of more cameras and thus a greater number of captured images with a greater variation in light acquisition configurations. Such a numerical increase in images and increased variation in light acquisition configurations increases a likelihood that a collection of images captured by the first camera 120, the second camera 130, the third camera 420, or the fourth camera 430 will contain necessary data for precisely locating a point on a surface of the target object 140.

Figure 5:
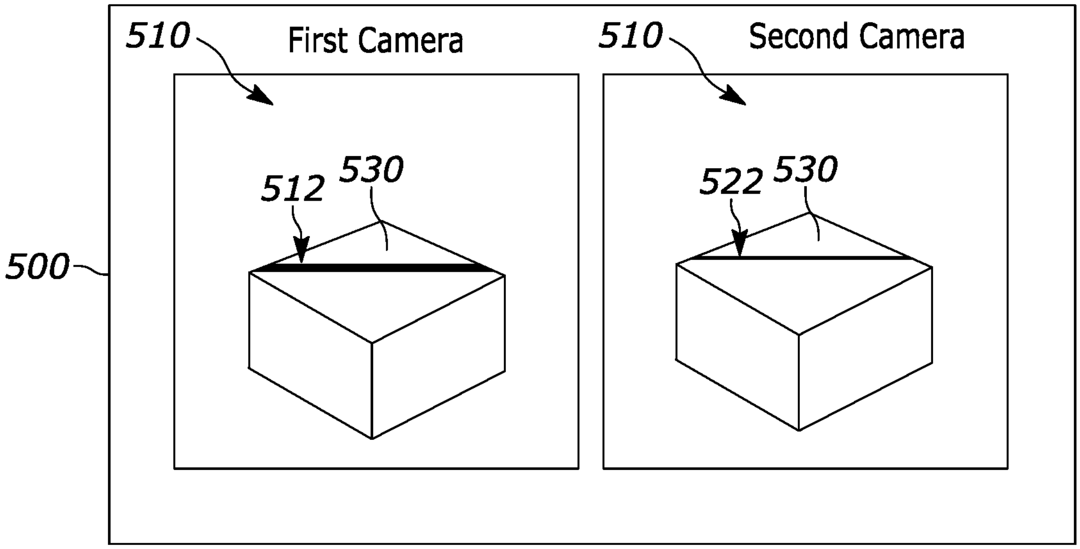
FIG. 5 illustrates a pair of example images of an object captured simultaneously by a first camera and a second camera, according to embodiments of the present disclosure.

FIG. 5 illustrates a pair of example images 500 of an object 530 captured simultaneously by a first camera and a second camera, according to embodiments of the present disclosure. The pair of example images 500 consists of a first image 510 captured by a first camera with a first light acquisition configuration and a second image 520 captured by a second camera with a second light acquisition configuration simultaneously with the first image 510. In both the first image 510 and the second image 520, the object 530 is seen from a typical perspective of a camera of a scanner consistent with embodiments of the present disclosure (see FIG. 1).

As can easily be seen, the first apparent laser line 512 in the first image 510 appears as a much thicker line than the second apparent laser line 522 in the second image 520. In this example scenario, the first apparent laser line 512 and the second apparent laser line 522 are actually a same laser line. Differences in size between the first apparent laser line 512 and the second apparent laser line 522 can be explained by a difference in light acquisition configuration between the first camera and the second camera. In this example scenario, the first camera is configured to acquire a larger quantity of light than the second camera, resulting in a more saturated first apparent laser line 512 than the second apparent laser line 522. The light acquisition configuration may be any configuration that regulates an amount of light that is detected by the first camera or the second camera (see FIG. 2).

While both the first image 510 and the second image 520 are depicted as having been taken from approximately a same perspective, it will be appreciated that this is for illustrative purposes in demonstrating the different light acquisition configurations and that in reality differing perspectives will be necessitated by a physical geometry of the first camera and the second camera. Additionally, in settings where the target object 530 is highly reflective in nature, a variation in perspective of the first camera and the second camera may be desirable so that portions of a laser line that are saturated in the first image 510 may not be saturated in the second image 520 and vice versa. The first camera and the second camera may be configured to automatically alter their respective light acquisition configurations responsive to detecting insufficient light or saturation of an image. Such an arrangement may result in instances where the first camera and the second camera are configured with a same or similar light acquisition configuration, in which case the variation in perspective provides the principal advantages of imaging the target object 530 with such a system.

Figure 7:
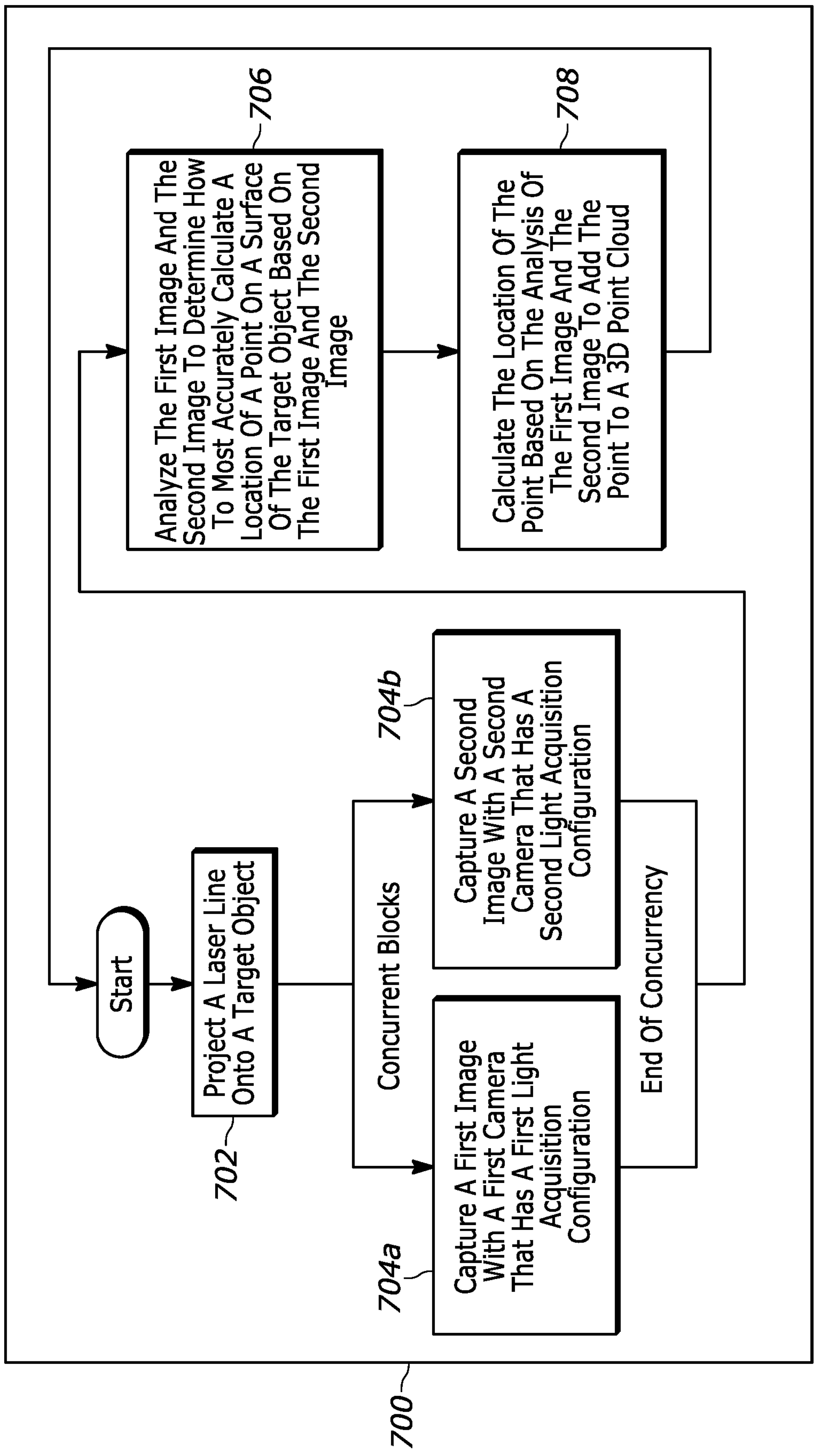
FIG. 7 illustrates a flowchart of an example method for generating digital 3D point clouds of physical objects, according to embodiments of the present disclosure.
Figure 8:
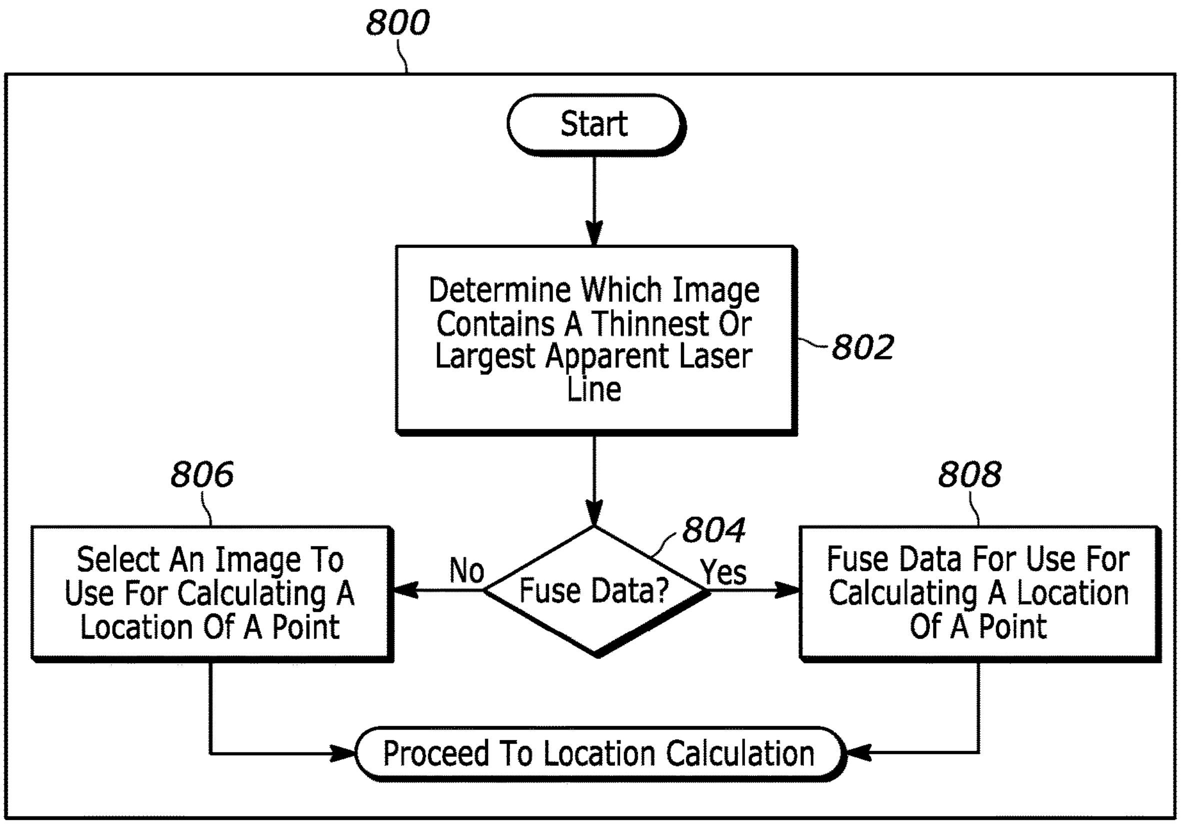
FIG. 8 illustrates a flowchart of an example method for analyzing scanner data to determine how to best calculate a location of a point, according to embodiments of the present disclosure.

The first image 510 and the second image 520 may be sent to a processing device for analysis (see FIG. 7 and FIG. 8). It will be appreciated that additional images captured by additional cameras may be present, in which case the additional images may also be sent to the processing device for analysis (see FIG. 2).

Figure 6:
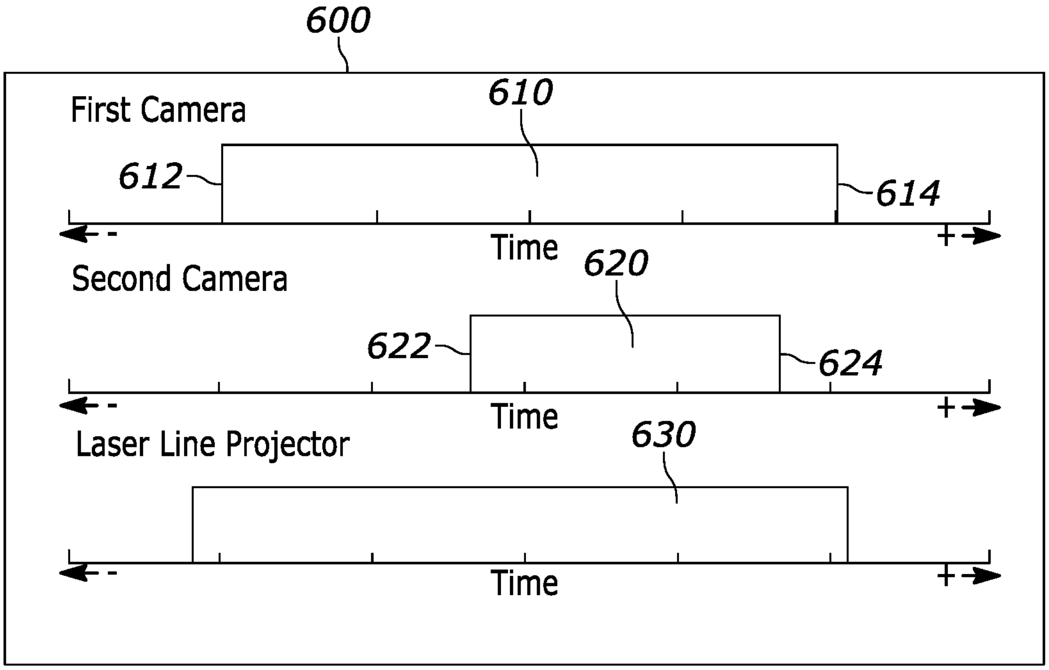
FIG. 6 illustrates an example timing diagram for an example scanner, according to embodiments of the present disclosure.

FIG. 6 illustrates an example timing diagram 600 for an example scanner, according to embodiments of the present disclosure. The timing diagram 600 includes a first exposure time 610 with a first exposure start time 612 and a first exposure end time 614 of a first camera, a second exposure time 620 with a second exposure start time 622 and a second exposure end time 624 of a second camera, and an active time 630 of a laser line projector.

In this example scenario, a target object moves into a position beneath the laser line projector. This event may be paired with a frame trigger and a line trigger, where the frame trigger is indicative of the target object being beneath the laser line projector and the line trigger being indicative of the target object being in a position such that the scanner is configured to capture data about a particular portion of the target object on which the laser line is actively being projected. As such, the frame trigger may be active for an entirety of a period of time in which the target object is beneath the laser line projector, and the line trigger may be configured to periodically oscillate between active and inactive in order to facilitate capture of numerous images as the target item passes beneath the laser line projector. What is depicted in the example timing diagram 600 is a course of events that may occur every time the line trigger becomes active, and thus may be repeated many times in the course of a single target object passing beneath the laser line projector.

In this example scenario, responsive to the line trigger becoming active, the laser line projector is configured to begin the active time 630 and project the laser line onto the target object. Shortly after the laser line projection begins, the first exposure start time 612 occurs and the first camera begins the first exposure time 610 which occurs partially simultaneously with the second exposure time 620. After a predetermined time elapses, the second exposure start time 622 occurs and the second camera begins the second exposure time 620. The second exposure time 620 lasts a predetermined duration, then the second exposure end time 624 occurs and the second camera ends the second exposure time 620. After a predetermined time elapses, the first exposure end time 614 occurs and the first camera ends the first exposure time 610. Shortly thereafter, the laser line projector finally ends the active time 630. It should be noted that because the first camera and the second camera may be physically offset from one another, the first exposure time 610 and the second exposure time 620 may centered on different times in order to capture images of the target object in an approximately same position.

In some example scenarios, a method of altering a light acquisition configuration other than varying exposure times may be used (see FIG. 1). In such a situation, the first exposure time 610 and the second exposure time 620 may be of a same length. It will be appreciated that relative lengths of the first exposure time 610, the second exposure time 620, and the active time 630 may be significantly different from what is illustrated herein.

When a second image of the target object is captured, the first exposure 610 may be of a length equivalent to an initial length of the second exposure 620 and the second exposure 620 may be of a length equivalent to an initial length of the first exposure 610. In this manner, a high exposure image and a low exposure image may be captured at each perspective made available to a processing device by a plurality of cameras in communication with said processing device. Additionally, both the first camera and the second camera may initially capture images with an exposure time equivalent in length to the first exposure time 610 and then subsequently capture images with an exposure time equivalent to the second exposure time 620 or vice versa. This concept may be extended to other methods of manipulating the light acquisition configurations of the cameras respectively. For example, both cameras may initially capture images of the target object with a high analog gain followed by capturing images of the target object with a low analog gain, or vice versa. Alternatively, the first camera may initially capture an image with a high analog gain while the second camera captures an image with a low analog gain, then the first camera captures an image with a low analog gain and the second camera captures an image with a high analog gain. It will be appreciated that combinations of different methods for manipulating the light acquisition configurations of the first camera and the second camera may be implemented in any conceivable manner, including combinations where alterations that increase a quantity of light acquired are combined with alterations that decrease a quantity of light acquired and vice versa.

FIG. 7 illustrates a flowchart of an example method 700 for generating digital 3D point clouds of physical objects, according to embodiments of the present disclosure. It should be appreciated that the example method 700 is presented with a high level of abstraction, and that the blocks of the flow chart depicted in FIG. 7 may consist of a number of activities, some of which may not be described herein.

At block 702, an example laser scanner projects a laser line onto a surface of a target object. The projecting the laser line may be responsive to the scanner detecting an object moving beneath the scanner and the scanner may be configured to continuously project the laser line until the object has left a scanning area beneath the scanner. Alternatively, the laser line may be projected as a pulse when a camera of the scanner is capturing an image. In such a scenario, the laser line may be pulsed many times in rapid succession when an object is passing beneath the scanner as one or more cameras repeatedly capture images of the object. The scanner then proceeds concurrently to blocks 704*a* and 704*b*.

At block 704*a*, the scanner captures a first image of the object with a first camera that has a first light acquisition configuration. The first camera may be configured to maintain the first light acquisition configuration throughout a scan time of the object. The first camera may instead be configured to adjust the first light acquisition configuration responsive to detecting that too much or too little light is being acquired. The detection that too much or too little light is being acquired may be achieved by hardware or software of the first camera, an analysis of the first image by the processing device, or combinations thereof. It should be appreciated that the terminology "first image" is for explanatory purposes to associate the first image with the first camera. In practice, the first image may be a second, third, fourth, etc. image taken by the first camera, as a typical scanning process will likely entail each camera capturing many images.

At block 704*b*, the scanner captures a second image of the object with a second camera that has a second light acquisition configuration. The second camera may be configured to maintain the second light acquisition configuration throughout a scan time of the object. The second camera may instead be configured to adjust the second light acquisition configuration responsive to detecting that too much or too little light is being acquired. The detection that too much or too little light is being acquired may be achieved by hardware or software of the second camera, an analysis of the second image by the processing device, or combinations thereof. It should be appreciated that the terminology "second image" is for explanatory purposes to associate the second image with the second camera. In practice, the second image may be a first, third, fourth, etc. image taken by the second camera, as a typical scanning process will likely entail each camera capturing many images.

It will also be appreciated that blocks 704*a* and 704*b* may be duplicated for any additional cameras which a scanner possesses. These additional blocks may be executed concurrently with 704*a* and 704*b* in a form of 704*c*, 704*d*, 704*e*, etc. After capturing the first image and the second image (and any additional images from additional cameras) the scanner proceeds to block 706. In this example, this marks an end of a concurrent section of the method 700, however other example embodiments may execute blocks 704*a* and 704*b* serially. Other example embodiments may execute other blocks concurrently, such as blocks 706 and 708, and the concurrency depicted herein is intended for illustrative purposes only, not for limiting the scope or meaning of the claims.

At block 706, the scanner analyzes the first image and the second image to determine how to most accurately calculate a location of a point on a surface of the object based on the first image and the second image. The scanner may detect that an image contains one of a too large laser line or a thinnest laser line when making the determination. In such a scenario, the scanner may choose a single image of the first image or the second image with which to execute a location calculation. Alternatively, the scanner may fuse data from the first image and the second image to execute the location calculation.

For example, the scanner may determine that the first image contains a thinnest laser line on one side of a target object, comprising about half of the laser line's length, but may also determine that a remainder of the laser line's length is saturated because the object has reflected light towards the first camera. The scanner may then determine that the second image contains the thinnest laser line for a section of the laser line that is saturated in the first image while the section of the laser line which is the thinnest in the first image is saturated in the second image.

In this scenario, the scanner may be configured to combine the portions of the first image that contain the thinnest laser line with the portions of the second image that contain the thinnest laser lint to create a dataset that may be used to calculate point locations along the entire laser line. Alternatively, when the scanner is calculating a location of a single point at a time, the scanner may be configured to use the image that contains the easiest-to-measure laser line at a point that is currently being located.

When the scanner determines that both the first image and the second image contain laser lines that have overlapping sections that are thin enough for the scanner to make location calculations, the scanner may calculate point locations based upon the laser lines in both the first image and the second image and combine the data to calculate a final point location more accurately. For example, the scanner may determine that the first image and the second image each contain a laser line that is equally thin and that both images' laser lines are suitable for calculating point locations. The scanner may be configured to calculate a first point location from the laser line in the first image, calculate a second point location from the laser line in the second image, then combine the first point location with the second point location to determine a final composite point location. The combination of the first point location with the second point location may be in the form of an average, a weighted average, a median (particularly in scanner configurations that contain additional cameras that provide additional images), or any other way of combining multiple measurements to account for error. In examples where a weighted average is employed, the scanner may base the weights upon laser line thickness in the respective images. After analyzing the images to determine how to most accurately calculate the location of the point, the scanner then proceeds to block 708.

At block 708, the scanner calculates the location of the point based on the analysis of the first image and the second image to add the point to a 3D point cloud. The scanner executes the calculations as described above based upon the determination in block 706. The scanner may achieve this with a processing device.

Once a point location has been determined, the scanner may be configured to add the point location to a 3D point cloud. A 3D point cloud is a collection of point locations that, when arranged together, roughly follow a contour of an object that has been scanned. The 3D point cloud may later be used to construct a more complete 3D model of the object. Once the point location has been added to the 3D point cloud, the scanner may be configured to store the 3D point cloud in a memory for later retrieval.

The scanner then proceeds to the start of the example method 700 to repeat an image capture and analysis process until the object has been satisfactorily scanned. In examples where the laser line is continuously projected onto the target object and not pulsed with each image capture, the scanner may omit block 702 when repeating the method 700, as block 702 is only necessary when the laser line is not being currently projected. If this is the last time the scanner is executing the method 700, either because the object is leaving a scanning area or for some other reason, the scanner may cease projecting the laser line at block 706.

FIG. 8 illustrates a flowchart of an example method 800 for analyzing scanner data to determine how to best calculate a location of a point, according to embodiments of the present disclosure. It should be appreciated that the example method 800 is presented with a high level of abstraction, and that the blocks of the flow chart depicted in FIG. 8 may consist of a number of activities, some of which may not be described herein.

At block 802, an example scanner compares two or more images to determine which image contains a thinnest or largest apparent laser line. When calculating point locations based upon a projected laser line, it may be desirable to make the calculations based upon a thinnest possible line because the thinnest line provides superior precision when compared to a large line. A determination of a largest line may be for the purpose of excluding the largest line from calculation data.

The scanner may determine that a portion of a laser line in a first image is the thinnest, but a different portion of the laser line in a second image is the thinnest. In such a scenario, the scanner may combine the portion of the first image that contains the thinnest laser line with the portion of the second image that contains a thinnest laser line in order to enable location calculations along an entire length of the laser line. These determinations may be made for a single point at a time, or may be made for all points along the laser line simultaneously. The scanner then proceeds to block 804 to determine how best to calculate point locations based upon the available images.

At block 804, the scanner determines whether data from two or more of the images should be fused to allow a most accurate possible calculation of point locations. Fusion of data is simply a combination of data from two or more sources to make determinations that would not be possible from a single source. In the context of the present disclosure, fusion refers to extracting date from multiple images to determine a location of a single point or grouping of points.

When the scanner determines that one image contains all necessary information for calculating point locations within an acceptable degree of accuracy, the scanner proceeds to block 806. When the scanner determines that an accurate calculation of point locations requires data that is present across multiple images, the scanner proceeds to block 808. The determination that an accurate calculation of point locations requires data from multiple images may be based upon a portion of a laser line in a first image being a thinnest apparent laser line while a remainder of the laser line is saturated, necessitating reconstruction of the remainder of the laser line from one or more additional images in which the remainder of the laser line is not saturated. This and other scenarios are described in greater detail in FIG. 7.

At block 806, the scanner selects an image for calculating the location of a point. This selection may be made for a grouping of points all at once, or may be made individually for each point for which the scanner executes a location calculation. The image may be selected based upon a thickness of an apparent laser line contained in the image, or the image may be selected on other criteria not discussed herein. The scanner then proceeds to location calculation to determine a location of the point or grouping of points.

At block 808, the scanner fuses data from the images that were determined to contain necessary information for location calculation in block 804. The fusion of the data may take the form of a composite image, an average, a weighted average, a median, or any other way of combining data. Point locations may be calculated based on data from multiple individual images and combined in such a way, or raw image data may be combined to calculate a single point location (see FIG. 7). The scanner then proceeds to location calculation to determine a location of the point or grouping of points.

Figure 9:
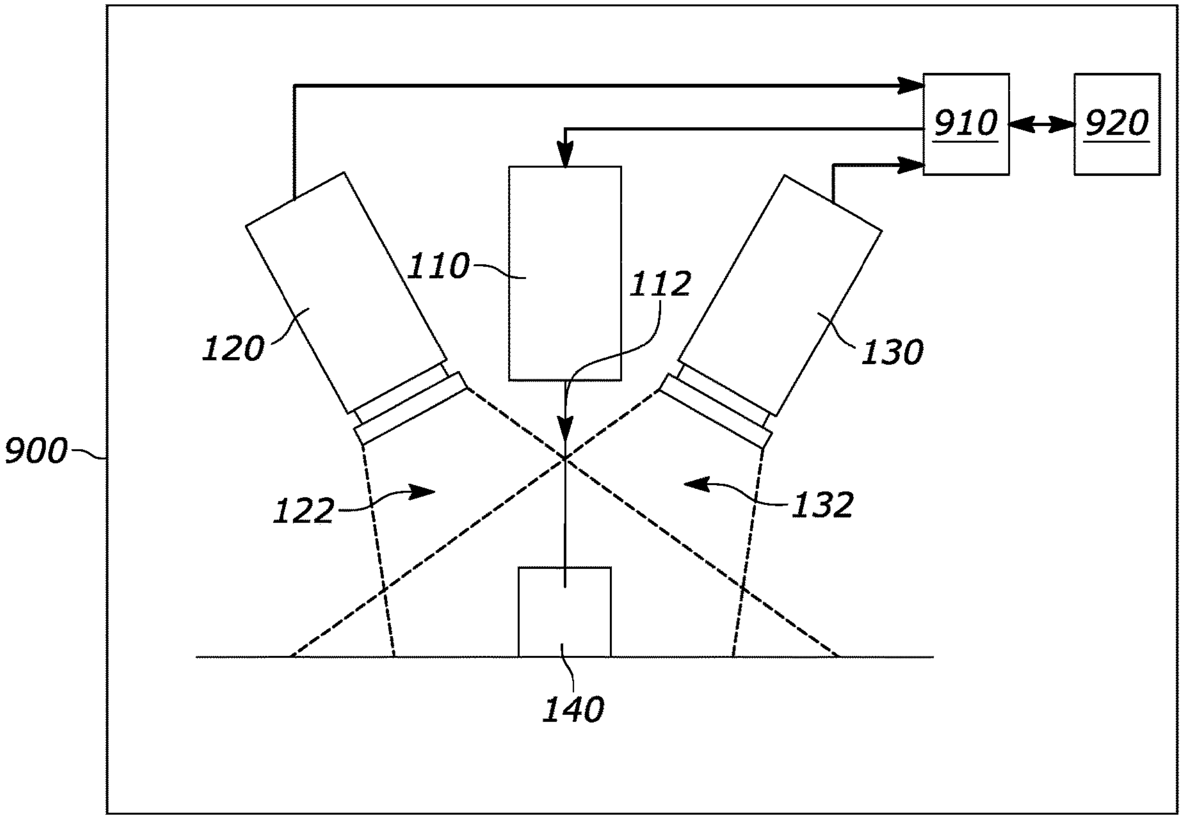
FIG. 9 illustrates an example system, according to embodiments of the present disclosure.

FIG. 9 illustrates an example system 900, according to embodiments of the present disclosure. The system 900 comprises a laser line projector 110 configured to project a laser line 112 onto a target object 140 within a first field of view 122 of a first camera 120 and a second field of view 132 of a second camera 130. The laser line projector 110, the first camera 120, and the second camera 130 are in communication with a processing device 910 which is coupled to a memory 920.

The processing device 910 may be configured to execute instructions contained in the memory 920 which cause the processing device to execute methods similar to those depicted in FIG. 7 and FIG. 8. The processing device may also be in communication with additional cameras (see FIG. 2 and FIG. 4) or laser line projectors (see FIG. 3 and FIG. 4). The memory 920 may store a 3D point cloud of the target object 140 in addition to point clouds corresponding to previously scanned target objects, and may be accessible to other processing devices of other systems not depicted herein.

The above description refers to a block diagram of the accompanying drawings. Alternative implementations of the example represented by the block diagram include one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A scanner, comprising:

a laser line projector configured to project a laser line;

a first camera having a first light acquisition configuration; and a second camera having a second light acquisition configuration different from the first light acquisition configuration, wherein the first camera and the second camera are configured to simultaneously image a target object while the laser line is projected onto the target object and wherein the first camera has a different light acquisition configuration from the second camera, and wherein the first light acquisition configuration and the second light acquisition configuration differ in at least one of exposure time, optical filtering, aperture size, sensor sensitivity, or analog gain, wherein the scanner is configured to analyze a first image captured by the first camera and a second image captured by the second camera to determine whether to calculate a location of a point on a surface of the target object based upon data from a selected camera of one of the first camera or the second camera or based upon fused data generated with data from the first camera and data from the second camera, and wherein, when the scanner calculates the location of the point based upon the data from the selected camera, the scanner chooses the selected camera responsive to at least one of a determination that an image from an unselected camera contains a too large apparent laser line or a determination that an image from the selected camera contains a thinnest apparent laser line.

2. The scanner of claim 1, wherein a light acquisition configuration comprises an exposure time, and the first camera is configured to begin a first exposure at a first time before the second camera is configured to begin a second exposure at a second time and the first exposure is configured to end at a fourth time after the second exposure is configured to end at a third time.

3. The scanner of claim 1, further comprising at least one additional camera configured with a light acquisition configuration that differs from a light acquisition configuration of the first camera and a light acquisition configuration of the second camera.

4. The scanner of claim 1, wherein the scanner calculates a location of an additional point on a surface of the target object based upon data from a selected camera of one of the first camera or the second camera.

5. The scanner of claim 4, wherein the scanner chooses the selected camera responsive to at least one of a determination that an image from an unselected camera contains a too large apparent laser line or a determination that an image from the selected camera contains a thinnest apparent laser line.

6. The scanner of claim 5, wherein the selected camera is chosen for all points visible in an image based upon a single determination.

7. The scanner of claim 1, wherein the scanner generates fused data with data from the first camera and data from the second camera and calculates a location of a point on a surface of the object based upon the fused data.

8. The scanner of claim 1, wherein the laser line projector is configured to project a laser line as a pulse when at least one of the first camera and the second camera are capturing an image.

9. A method for generating digital 3D point clouds of physical objects comprising:

projecting a laser line onto a target object;

capturing a first image with a first camera that has a first light acquisition configuration;

simultaneously capturing a second image with a second camera that has a second light acquisition configuration, wherein the first light acquisition configuration and the second light acquisition configuration differ in at least one of exposure time, optical filtering, aperture size, sensor sensitivity, or analog gain;

analyzing the first image and the second image to determine how to most accurately calculate a location of a point on a surface of the target object based on the first image and the second image, including determining whether to calculate the location of the point based upon data from a selected camera of one of the first camera or the second camera or based upon fused data generated with the first image and the second image; and calculating the location of the point based on the analysis of the first image and the second image to add the point to a 3D point cloud, wherein, when the location of the point is calculated based upon the data from the selected camera, the selected camera is chosen responsive to at least one of a determination that an image from an unselected camera contains a too large apparent laser line or a determination that an image from the selected camera contains a thinnest apparent laser line.

10. The method of claim 9, further comprising adding the point to the 3D point cloud and storing the 3D point cloud in a memory.

11. The method of claim 9, wherein the analyzing comprises determining that an image contains at least one of a thinnest apparent laser line or a largest apparent laser line.

12. The method of claim 11, further comprising either generating fused data with the first image and the second image or selecting a camera responsive to the determination that an image contains at least one of a thinnest apparent laser line or a largest apparent laser line, and calculating a location of the point based upon the fused data or data from the selected camera.

13. The method of claim 9, further comprising capturing and analyzing additional images with additional cameras that have light acquisition configurations that differ from each other and those of the first camera and the second camera.

14. The method of claim 9, further comprising projecting at least one additional laser line onto the target object.

15. The method of claim 9, wherein capturing the first image is partially simultaneous with the capturing the second image.

16. A system, comprising:

a memory; and a processing device, operatively coupled to the memory, to:

project a laser line onto a target object;

capture a first image with a first camera that has a first light acquisition configuration;

simultaneously capture a second image with a second camera that has a second light acquisition configuration, wherein the first light acquisition configuration and the second light acquisition configuration differ in at least one of exposure time, optical filtering, aperture size, sensor sensitivity, or analog gain;

analyze the first image and the second image to determine how to most accurately calculate a location of a point on a surface of the target object based on the first image and the second image, including determining whether to calculate the location of the point based upon data from a selected camera of one of the first camera or the second camera or based upon fused data generated with the first image and the second image; and calculate the location of the point based on the analysis of the first image and the second image to add the point to a 3D point cloud, wherein, when the location of the point is calculated based upon the data from the selected camera, the selected camera is chosen responsive to at least one of a determination that an image from an unselected camera contains a too large apparent laser line or a determination that an image from the selected camera contains a thinnest apparent laser line.

17. The system of claim 16, wherein the system is configured to add the point to the 3D point cloud and store the 3D point cloud in a memory.

18. The system of claim 16, wherein the analysis comprises a determination that an image contains at least one of a thinnest apparent laser line or a largest apparent laser line.

19. The system of claim 18, wherein the processing device either generates fused data with the first image and the second image or selects a camera responsive to the determination that an image contains at least one of a thinnest apparent laser line or a largest apparent laser line, and calculates a location of the point based upon the fused data or data from the selected camera.

20. The system of claim 16, wherein the system is configured to capture and analyze additional images with additional cameras that have light acquisition configurations that differ from each other and those of the first camera and the second camera.

* * * * *